US 11,350,094 B2

(12) United States Patent
Li et al.

(10) Patent No.: US 11,350,094 B2
(45) Date of Patent: May 31, 2022

(54) METHOD AND APPARATUS FOR VIDEO CODING

(71) Applicant: TENCENT AMERICA LLC, Palo Alto, CA (US)

(72) Inventors: Xiang Li, Saratoga, CA (US);
Xiaozhong Xu, State College, PA (US);
Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/093,314

(22) Filed: Nov. 9, 2020

(65) Prior Publication Data

US 2021/0058621 A1 Feb. 25, 2021

Related U.S. Application Data

(63) Continuation of application No. 16/727,707, filed on Dec. 26, 2019, now Pat. No. 10,869,038, which is a
(Continued)

(51) Int. Cl.
*H04N 19/124* (2014.01)
*H04N 19/196* (2014.01)
(Continued)

(52) U.S. Cl.
CPC ......... *H04N 19/124* (2014.11); *H04N 19/172* (2014.11); *H04N 19/197* (2014.11);
(Continued)

(58) Field of Classification Search
None
See application file for complete search history.

(56) References Cited

U.S. PATENT DOCUMENTS

2007/0147497 A1* 6/2007 Bao .................. H04N 19/126
375/240.03
2008/0304562 A1 12/2008 Chang
(Continued)

FOREIGN PATENT DOCUMENTS

CN 106464885 A 2/2017
WO 2013159335 A1 10/2013

OTHER PUBLICATIONS

High Efficiency Video Coding (HEVC), Rec. ITU-T H.265 and ISO/IEC 23008-2, Dec. 2016.
(Continued)

*Primary Examiner* — Frederick D Bailey
(74) *Attorney, Agent, or Firm* — ArentFox Schiff LLP

(57) ABSTRACT

Aspects of the disclosure provide method and apparatus for video coding. In some examples, an apparatus includes receiving circuitry and processing circuitry. The processing circuitry decodes, from a coded video bitstream, a syntax element for an adjusted version of an initial quantization parameter (QP) value at a picture level for a picture. The adjusted version is in a range with an upper boundary that is changed with a maximum QP value. Then, the processing circuitry determines the initial QP value of a segment (such as a slice, a tile, a group of tiles and the like) in the picture based on the syntax element and determines a QP value for a block in the segment according to the initial QP value of the segment and adjustments associated with the block. Then, the processing circuitry performs an inverse quantization on quantized data of the block according to the determined QP value.

23 Claims, 8 Drawing Sheets

Related U.S. Application Data continuation of application No. 16/198,966, filed on Nov. 23, 2018, now Pat. No. 10,554,975.

(60) Provisional application No. 62/739,312, filed on Sep. 30, 2018.

(51) Int. Cl.
| | | |
|---|---|---|
| *H04N 19/70* | (2014.01) | |
| *H04N 19/172* | (2014.01) | |
| *H04N 19/91* | (2014.01) | |
| *H04N 19/159* | (2014.01) | |

(52) U.S. Cl.
CPC ........... *H04N 19/70* (2014.11); *H04N 19/159* (2014.11); *H04N 19/91* (2014.11)

(56) References Cited

U.S. PATENT DOCUMENTS

| | | | |
|---|---|---|---|
| 2010/0086025 A1* | 4/2010 | Chen | H04N 19/147 375/240.03 |
| 2013/0002905 A1 | 1/2013 | Takakura | |
| 2013/0003865 A1 | 1/2013 | Norkin | |
| 2013/0089140 A1 | 4/2013 | Kudana | |
| 2014/0079135 A1 | 3/2014 | Van der Auwera et al. | |
| 2014/0341276 A1 | 11/2014 | Lee | |
| 2014/0348227 A1 | 11/2014 | Lee | |
| 2015/0358631 A1 | 12/2015 | Zhang et al. | |
| 2016/0360196 A1 | 12/2016 | Endo | |
| 2017/0208328 A1 | 7/2017 | Kuusela | |
| 2018/0242015 A1 | 8/2018 | Katsavounidis | |
| 2018/0367799 A1 | 12/2018 | Carmel | |

OTHER PUBLICATIONS

B. Brass, J.Chen, S. Liu, "Versatile Video Coding (Draft 2)", JVET-K1001-v7, Proceeding of the 11th JCT-VC meeting, Ljubljana, SI, Jul. 10-18, 2018.

Shih-Ta Hsiang et al. JVET-K0251_spec_text, Joint Video Experts Team(JVET) of ITU-T SG 16 WP 3 and ISO/IEC JTC 1/SC29/WG 11 11th Meeting: Ljubljana, SL, Jul. 10-18, 2018, 6 pages.

Chinese Office Action dated Apr. 2, 2022 in Application No. 201980050574.0 with English Tranlstaion.

* cited by examiner

A
METHOD AND APPARATUS FOR VIDEO CODING

INCORPORATION BY REFERENCE

This application is a continuation application of U.S. application Ser. No. 16/727,704, filed Dec. 26, 2019, which is a continuation application of U.S. application Ser. No. 16/198,966, filed Nov. 23, 2018, and is based upon and claims the benefit of priority to U.S. Provisional Application No. 62/739,312, "INITIAL SLICE LEVEL QP OFFSET SETTING" filed on Sep. 30, 2018, the entire contents of each of which are hereby incorporated herein by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Quantization parameter (QP) is one of the parameters to adjust the video quality and bitrate levels. For example, a low QP value can result in more information in the residual data and the coded video bitstream requires a high bitrate level, and a high QP value can result in loss of information in the residual data, and the coded video bitstream requires a low bitrate level.

SUMMARY

Aspects of the disclosure provide method and apparatus for video coding. In some examples, an apparatus includes receiving circuitry and processing circuitry. The processing circuitry decodes, from a coded video bitstream, a syntax element for an adjusted version of an initial quantization parameter (QP) value at a picture level for a picture. The adjusted version is in a range with an upper boundary that is changed with a maximum QP value. Then, the processing circuitry determines the initial QP value of a segment (such as a slice, a tile, a group of tiles and the like) in the picture based on the syntax element and determines a QP value for a block in the segment according to the initial QP value of the segment and adjustments associated with the block. Then, the processing circuitry performs an inverse quantization on quantized data of the block according to the determined QP value for the block.

In some embodiments, the processing circuitry decodes a segment level change for the initial QP value from the coded video bitstream, and determines the initial QP value for the segment according to the segment level change. In an example, the syntax element for the adjusted version of the initial QP value is decoded from a picture parameter set of the coded video bitstream.

In an embodiment, the processing circuitry recovers the initial QP value from the adjusted version of the initial QP value by adding a constant value. For example, the constant value is one of 26 or 28.

In another embodiment, the processing circuitry recovers the initial QP value from the adjusted version of the initial QP value based on the maximum QP value. For example, the processing circuitry recovers the initial QP value from the adjusted version of the initial QP value by adding a half of the maximum QP value. In an example, the processing circuitry bit-shifts the maximum QP value to right by one bit to calculate the half of the maximum QP value. In another example, the processing circuitry bit-shifts a sum of the maximum QP value and one to right by one bit to calculate the half of the maximum QP value.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
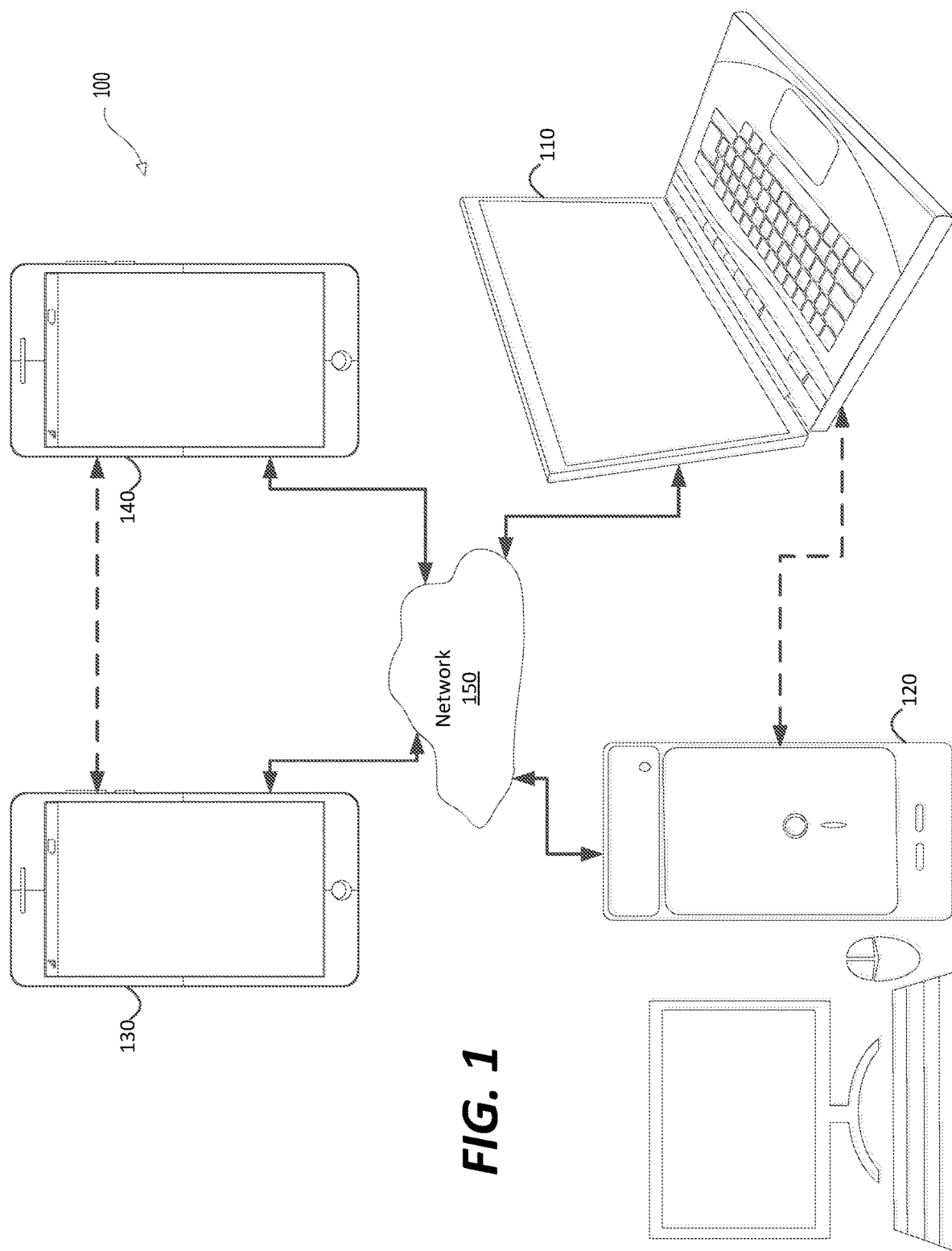
FIG. 1 is a schematic illustration of a simplified block diagram of a communication system (100) in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a first pair of terminal devices (110) and (120) interconnected via the network (150). In the FIG. 1 example, the first pair of terminal devices (110) and (120) performs unidirectional transmission of data. For example, the terminal device (110) may code video data (e.g., a stream of video pictures that are captured by the terminal device (110)) for transmission to the other terminal device (120) via the network (150). The encoded video data can be transmitted in the form of one or more coded video bitstreams. The terminal device (120) may receive the coded video data from the network (150), decode the coded video data to recover the video pictures and display video pictures according to the recovered video data. Unidirectional data transmission may be common in media serving applications and the like.

In another example, the communication system (100) includes a second pair of terminal devices (130) and (140) that performs bidirectional transmission of coded video data that may occur, for example, during videoconferencing. For bidirectional transmission of data, in an example, each terminal device of the terminal devices (130) and (140) may code video data (e.g., a stream of video pictures that are captured by the terminal device) for transmission to the other terminal device of the terminal devices (130) and (140) via the network (150). Each terminal device of the terminal devices (130) and (140) also may receive the coded video data transmitted by the other terminal device of the terminal devices (130) and (140), and may decode the coded video data to recover the video pictures and may display video pictures at an accessible display device according to the recovered video data.

In the FIG. 1 example, the terminal devices (110), (120), (130) and (140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminal devices (110), (120), (130) and (140), including for example wireline (wired) and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
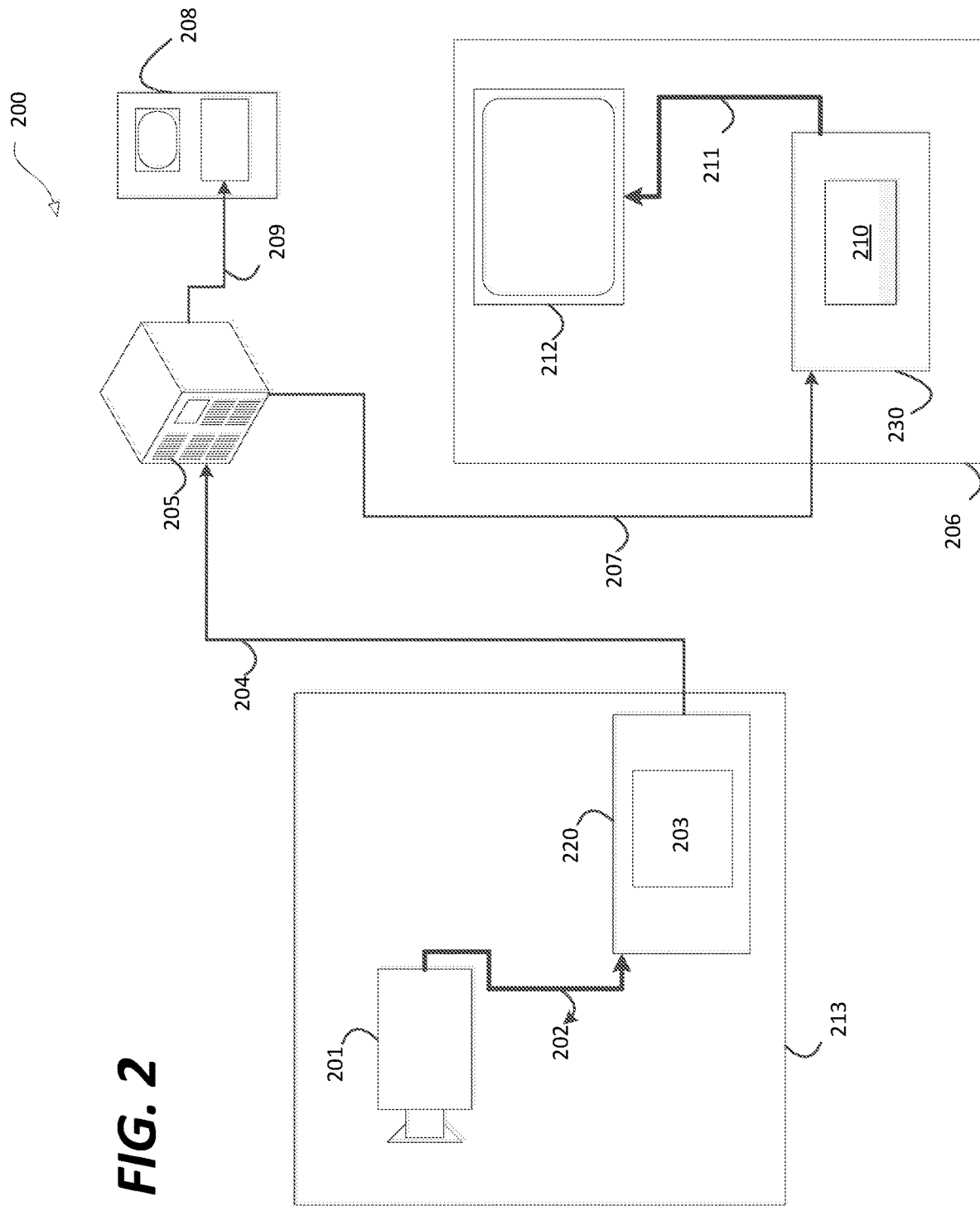
FIG. 2 is a schematic illustration of a simplified block diagram of a communication system (200) in accordance with an embodiment.

FIG. 2 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating for example a stream of video pictures (202) that are uncompressed. In an example, the stream of video pictures (202) includes samples that are taken by the digital camera. The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize the lower data volume when compared to the stream of video pictures (202), can be stored on a streaming server (205) for future use. One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that can be rendered on a display (212) (e.g., display screen) or other rendering device (not depicted). In some streaming systems, the encoded video data (204), (207), and (209) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (220) and (230) can include other components (not shown). For example, the electronic device (220) can include a video decoder (not shown) and the electronic device (230) can include a video encoder (not shown) as well.

Figure 3:
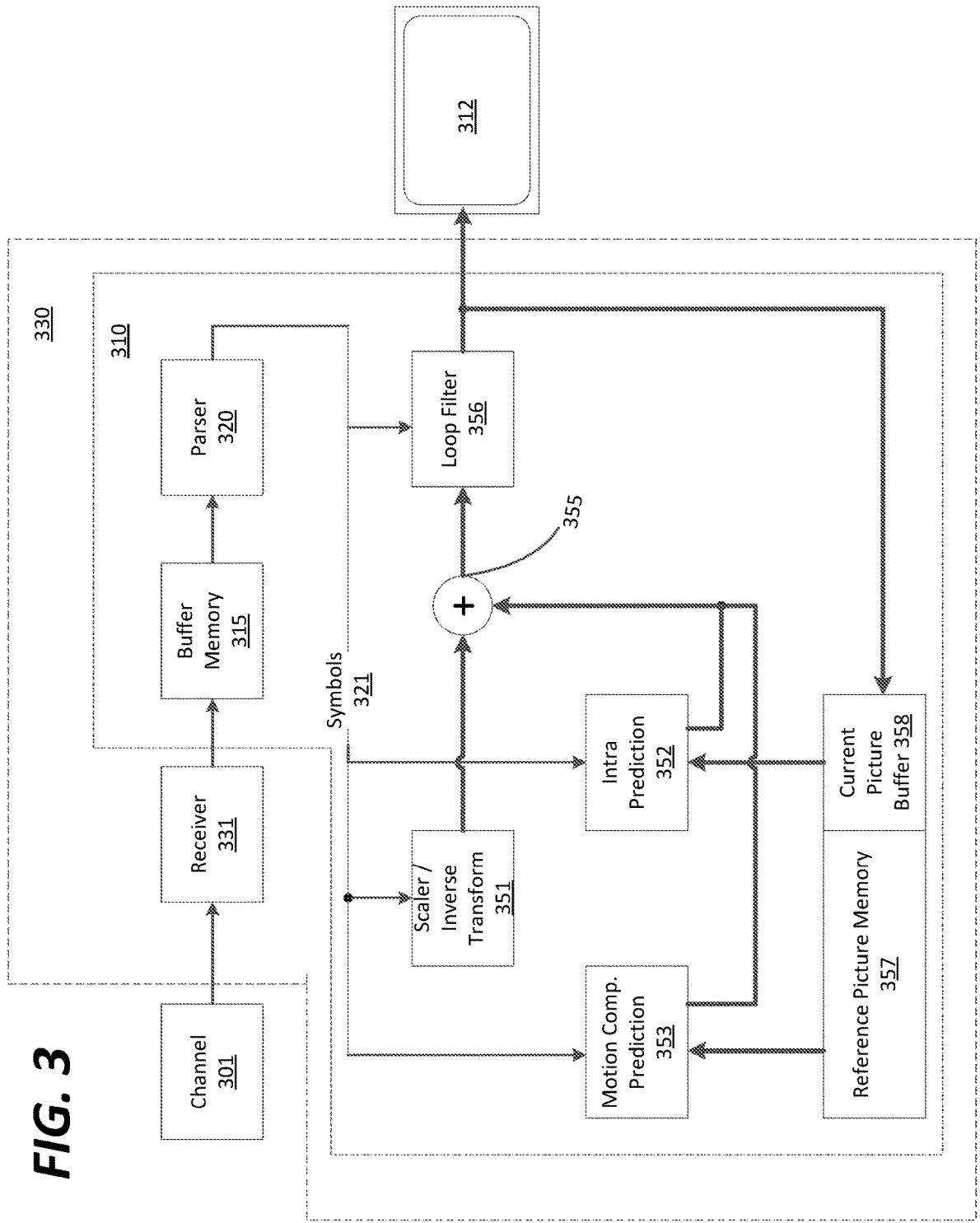
FIG. 3 is a schematic illustration of a simplified block diagram of a decoder in accordance with an embodiment.

FIG. 3 shows a block diagram of a video decoder (310) according to an embodiment of the present disclosure. The video decoder (310) can be included in an electronic device (330). The electronic device (330) can include a receiver (331) (e.g., receiving circuitry). The video decoder (310) can be used in the place of the video decoder (210) in the FIG. 2 example.

The receiver (331) may receive one or more coded video sequences to be decoded by the video decoder (310); in the same or another embodiment, one coded video sequence at a time, where the decoding of each coded video sequence is independent from other coded video sequences. The coded video sequence may be received from a channel (301), which may be a hardware/software link to a storage device which stores the encoded video data. The receiver (331) may receive the encoded video data with other data, for example, coded audio data and/or ancillary data streams, that may be forwarded to their respective using entities (not depicted). The receiver (331) may separate the coded video sequence from the other data. To combat network jitter, a buffer memory (315) may be coupled in between the receiver (331) and an entropy decoder/parser (320) ("parser (320)" henceforth). In certain applications, the buffer memory (315) is part of the video decoder (310). In others, it can be outside of the video decoder (310) (not depicted). In still others, there can be a buffer memory (not depicted) outside of the video decoder (310), for example to combat network jitter, and in addition another buffer memory (315) inside the video decoder (310), for example to handle playout timing. When the receiver (331) is receiving data from a store/forward device of sufficient bandwidth and controllability, or from an isosynchronous network, the buffer memory (315) may not be needed, or can be small. For use on best effort packet networks such as the Internet, the buffer memory (315) may be required, can be comparatively large and can be advantageously of adaptive size, and may at least partially be implemented in an operating system or similar elements (not depicted) outside of the video decoder (310).

The video decoder (310) may include the parser (320) to reconstruct symbols (321) from the coded video sequence. Categories of those symbols include information used to manage operation of the video decoder (310), and potentially information to control a rendering device such as a render device (312) (e.g., a display screen) that is not an integral part of the electronic device (330) but can be coupled to the electronic device (330), as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer memory (315), so as to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, the video decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives a quantized transform coefficient as well as control information, including which transform to use, block size, quantization factor, quantization scaling matrices, etc. as symbol(s) (321) from the parser (320). The scaler/inverse transform unit (351) can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current picture buffer (358). The current picture buffer (358) buffers, for example, partly reconstructed current picture and/or fully reconstructed current picture. The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so as to generate output sample information. The addresses within the reference picture memory (357) from where the motion compensation prediction unit (353) fetches prediction samples can be controlled by motion vectors, available to the motion compensation prediction unit (353) in the form of symbols (321) that can have, for example X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video sequence (also referred to as coded video bitstream) and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (312) as well as stored in the reference picture memory (357) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (320)), the current picture buffer (358) can become a part of the reference picture memory (357), and a fresh current picture buffer can be reallocated before commencing the reconstruction of the following coded picture.

The video decoder (310) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (331) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 4:
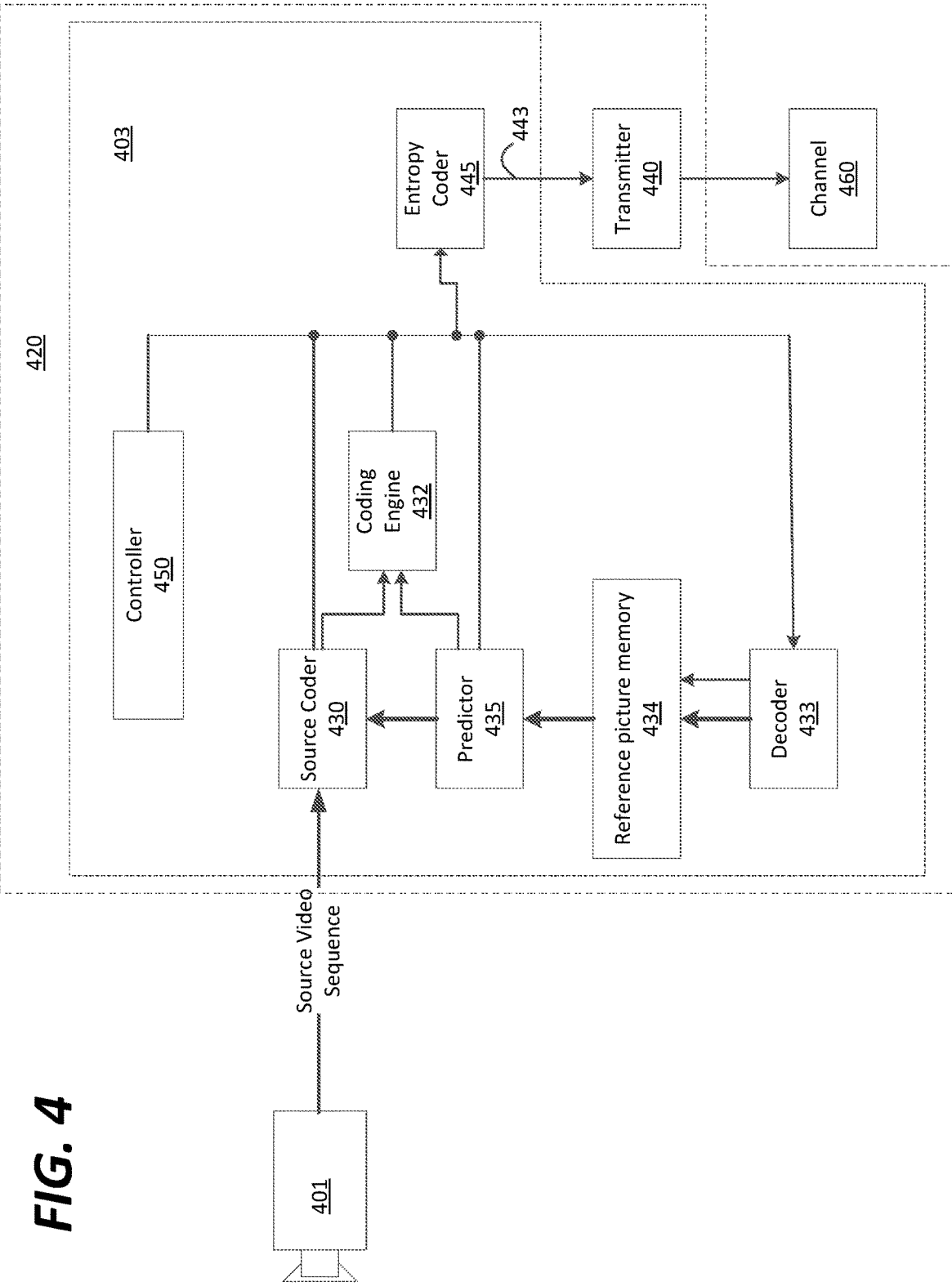
FIG. 4 is a schematic illustration of a simplified block diagram of an encoder in accordance with an embodiment.

FIG. 4 shows a block diagram of a video encoder (403) according to an embodiment of the present disclosure. The video encoder (403) is included in an electronic device (420). The electronic device (420) includes a transmitter (440) (e.g., transmitting circuitry). The video encoder (403) can be used in the place of the video encoder (203) in the FIG. 2 example.

The video encoder (403) may receive video samples from a video source (401)(that is not part of the electronic device (420) in the FIG. 4 example) that may capture video image(s) to be coded by the video encoder (403). In another example, the video source (401) is a part of the electronic device (420).

The video source (401) may provide the source video sequence to be coded by the video encoder (403) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (401) may be a storage device storing previously prepared video. In a videoconferencing system, the video source (401) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (403) may code and compress the pictures of the source video sequence into a coded video sequence (443) in real time or under any other time constraints as required by the application. Enforcing appropriate coding speed is one function of a controller (450). In some embodiments, the controller (450) controls other functional units as described below and is functionally coupled to the other functional units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. The controller (450) can be configured to have other suitable functions that pertain to the video encoder (403) optimized for a certain system design.

In some embodiments, the video encoder (403) is configured to operate in a coding loop. As an oversimplified description, in an example, the coding loop can include a source coder (430) (e.g., responsible for creating symbols, such as a symbol stream, based on an input picture to be coded, and a reference picture(s)), and a (local) decoder (433) embedded in the video encoder (403). The decoder (433) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (434). As the decoding of a symbol stream leads to bit-exact results independent of decoder location (local or remote), the content in the reference picture memory (434) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (433) can be the same as of a "remote" decoder, such as the video decoder (310), which has already been described in detail above in conjunction with FIG. 3. Briefly referring also to FIG. 3, however, as symbols are available and encoding/decoding of symbols to a coded video sequence by an entropy coder (445) and the parser (320) can be lossless, the entropy decoding parts of the video decoder (310), including the buffer memory (315), and parser (320) may not be fully implemented in the local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (430) may perform motion compensated predictive coding, which codes an input picture predictively with reference to one or more previously-coded picture from the video sequence that were designated as "reference pictures". In this manner, the coding engine (432) codes differences between pixel blocks of an input picture and pixel blocks of reference picture(s) that may be selected as prediction reference(s) to the input picture.

The local video decoder (433) may decode coded video data of pictures that may be designated as reference pictures, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference pictures and may cause reconstructed reference pictures to be stored in the reference picture cache (434). In this manner, the video encoder (403) may store copies of reconstructed reference pictures locally that have common content as the reconstructed reference pictures that will be obtained by a far-end video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the source coder (430), including, for example, setting of parameters and subgroup parameters used for encoding the video data.

Output of all aforementioned functional units may be subjected to entropy coding in the entropy coder (445). The entropy coder (445) translates the symbols as generated by the various functional units into a coded video sequence, by losslessly compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (403) may perform coding operations according to a predetermined video coding technology or standard, such as ITU-T Rec. H.265. In its operation, the video encoder (403) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The source coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 5:
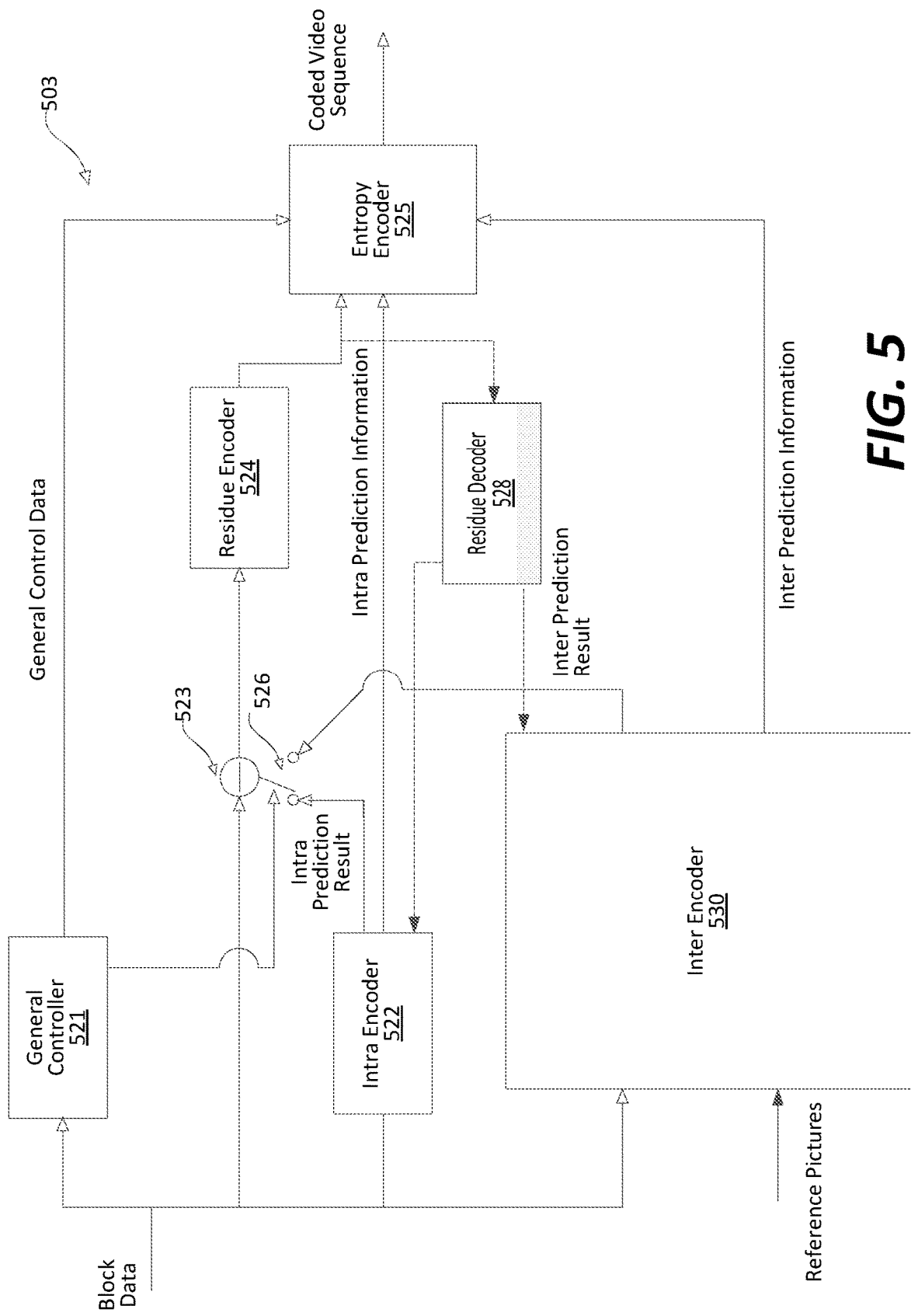
FIG. 5 shows a block diagram of an encoder in accordance with another embodiment.

FIG. 5 shows a diagram of a video encoder (503) according to another embodiment of the disclosure. The video encoder (503) is configured to receive a processing block (e.g., a prediction block) of sample values within a current video picture in a sequence of video pictures, and encode the processing block into a coded picture that is part of a coded video sequence. In an example, the video encoder (503) is used in the place of the video encoder (203) in the FIG. 2 example.

In an HEVC example, the video encoder (503) receives a matrix of sample values for a processing block, such as a prediction block of 8×8 samples, and the like. The video encoder (503) determines whether the processing block is best coded using intra mode, inter mode, or bi-prediction mode using, for example, rate-distortion optimization. When the processing block is to be coded in intra mode, the video encoder (503) may use an intra prediction technique to encode the processing block into the coded picture; and when the processing block is to be coded in inter mode or bi-prediction mode, the video encoder (503) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (503) includes other components, such as a mode decision module (not shown) to determine the mode of the processing blocks.

In the FIG. 5 example, the video encoder (503) includes the inter encoder (530), an intra encoder (522), a residue calculator (523), a switch (526), a residue encoder (524), a general controller (521) and an entropy encoder (525) coupled together as shown in FIG. 5.

The inter encoder (530) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (522) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques). In an example, the intra encoder (522) also calculates intra prediction results (e.g., predicted block) based on the intra prediction information and reference blocks in the same picture.

The general controller (521) is configured to determine general control data and control other components of the video encoder (503) based on the general control data. In an example, the general controller (521) determines the mode of the block, and provides a control signal to the switch (526) based on the mode. For example, when the mode is the intra, the general controller (521) controls the switch (526) to select the intra mode result for use by the residue calculator (523), and controls the entropy encoder (525) to select the intra prediction information and include the intra prediction information in the bitstream; and when the mode is the inter mode, the general controller (521) controls the switch (526) to select the inter prediction result for use by the residue calculator (523), and controls the entropy encoder (525) to select the inter prediction information and include the inter prediction information in the bitstream.

The residue calculator (523) is configured to calculate a difference (residue data) between the received block and prediction results selected from the intra encoder (522) or the inter encoder (530). The residue encoder (524) is configured to operate based on the residue data to encode the residue data to generate the transform coefficients. In an example, the residue encoder (524) is configured to convert the residue data in the frequency domain, and generate the transform coefficients. The transform coefficients are then subject to quantization processing to obtain quantized transform coefficients. In various embodiments, the video encoder (503) also includes a residue decoder (528). The residue decoder (528) is configured to perform inverse-transform, and generate the decoded residue data. The decoded residue data can be suitably used by the intra encoder (522) and the inter encoder (530). For example, the inter encoder (530) can generate decoded blocks based on the decoded residue data and inter prediction information, and the intra encoder (522) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (525) is configured to format the bitstream to include the encoded block. The entropy encoder (525) is configured to include various information according to a suitable standard, such as HEVC standard. In an example, the entropy encoder (525) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 6:
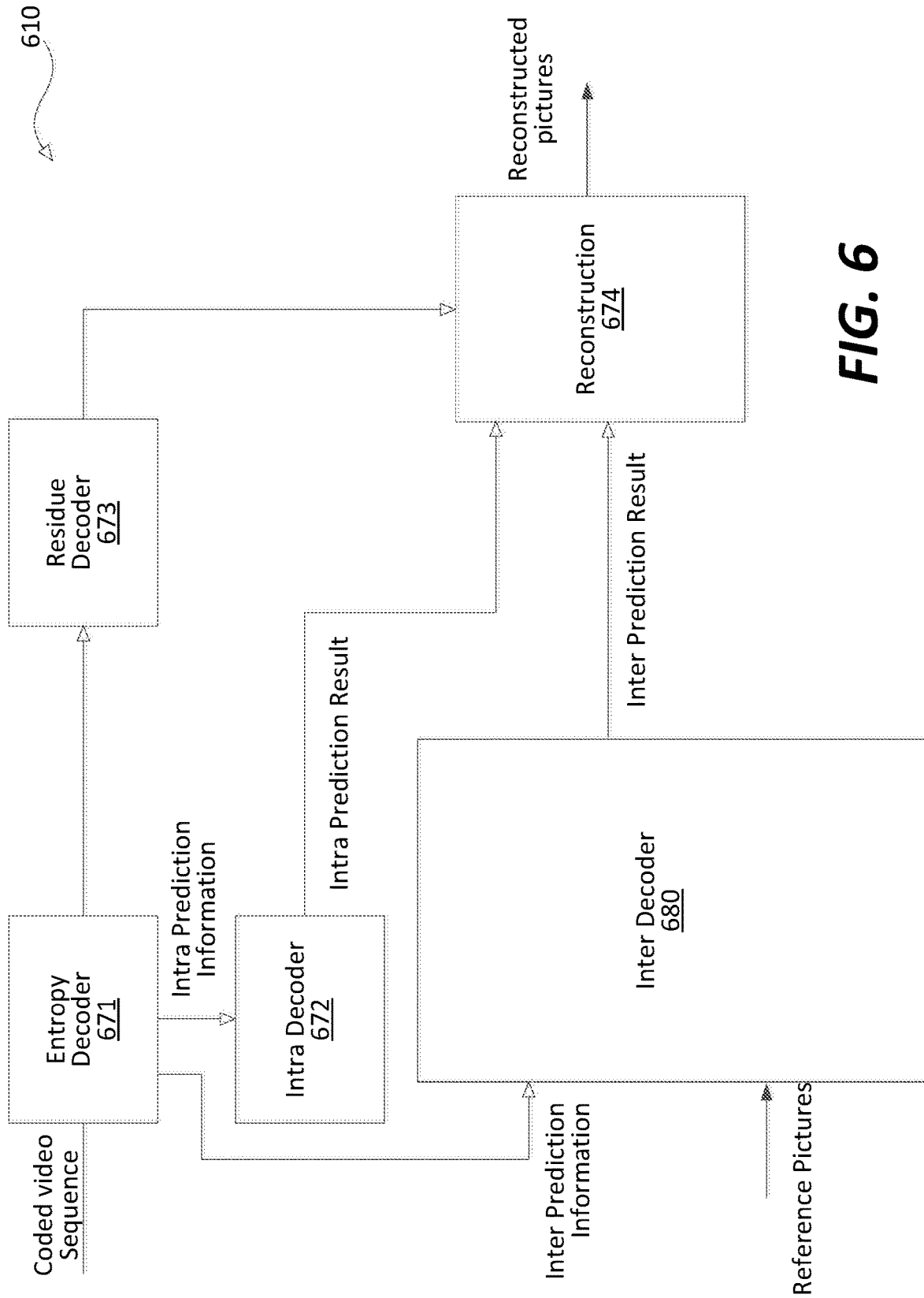
FIG. 6 shows a block diagram of a decoder in accordance with another embodiment.

FIG. 6 shows a diagram of a video decoder (610) according to another embodiment of the disclosure. The video decoder (610) is configured to receive a coded pictures that are part of a coded video sequence, and decode the coded picture to generate a reconstructed picture. In an example, the video decoder (610) is used in the place of the video decoder (210) in the FIG. 2 example.

In the FIG. 6 example, the video decoder (610) includes an entropy decoder (671), an inter decoder (680), a residue decoder (673), a reconstruction module (674), and an intra decoder (672) coupled together as shown in FIG. 6.

The entropy decoder (671) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (672) or the inter decoder (680) respectively residual information in the form of, for example, quantized transform coefficients, and the like. In an example, when the prediction mode is inter or bi-predicted mode, the inter prediction information is provided to the inter decoder (680); and when the prediction type is the intra prediction type, the intra prediction information is provided to the intra decoder (672). The residual information can be subject to inverse quantization and is provided to the residue decoder (673).

The inter decoder (680) is configured to receive the inter prediction information, and generate inter prediction results based on the inter prediction information.

The intra decoder (672) is configured to receive the intra prediction information, and generate prediction results based on the intra prediction information.

The residue decoder (673) is configured to perform inverse quantization to extract de-quantized transform coefficients, and process the de-quantized transform coefficients to convert the residual from the frequency domain to the spatial domain. The residue decoder (673) may also require certain control information (to include the Quantizer Parameter QP), and that information may be provided by the entropy decoder (671) (datapath not depicted as this may be low volume control information only).

The reconstruction module (674) is configured to combine, in the spatial domain, the residual as output by the residue decoder (673) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (203), (403) and (503), and the video decoders (210), (310) and (610) can be implemented using any suitable technique. In an embodiment, the video encoders (203), (403) and (503), and the video decoders (210), (310) and (610) can be implemented using one or more integrated circuits. In another embodiment, the video encoders (203), (403) and (403), and the video decoders (210), (310) and (610) can be implemented using one or more processors that execute software instructions.

Aspects of the disclosure provide techniques to set default quantization parameter (QP) values at a segment level. In an example, the segment can be a slice, a tile, a group of tiles and other suitable segmentations. While slice is used in some examples, the examples can be suitably modified for other segmentations, such as a tile, a group of tiles, and the like. In some embodiments, the techniques are used in advanced video codec to set an initial default QP value for the entire slice.

In an example, QP value is in a range from 0 to 51 inclusive. HEVC defines a couple of syntaxes related to QP, such as bit_depth_luma_minus8, init_qp_minus26, slice_qp_delta and the like.

The syntax bit_depth_luma_minus8 specifies the bit depth of the samples of the luma array BitDepthY and the value of the luma quantization parameter range offset QpBdOffsetY as shown in Eq. 1 and Eq. 2

$$BitDepth_Y = 8 + bit\_depth\_luma\_minus8 \qquad \text{Eq. 1}$$

$$QpBdOffset_Y = 6 \times bit\_depth\_luma\_minus8 \qquad \text{Eq. 2}$$

In an example, the syntax init_qp_minus26 can be used to specify the initial value for slice level QP SliceQpy. For example, init_qp_minus26 plus 26 specifies the initial value of $SliceQp_Y$ for each slice that refers to the picture parameter set (PPS). The initial value of $SliceQp_Y$ is modified at the slice segment layer when a non-zero value of slice_qp_delta is decoded. The value of init_qp_minus26 shall be in the range of $-(26+QpBdOffset_Y)$ to $+25$, inclusive. It is noted that init_qp_minus26 is signaled at PPS level in HEVC.

When the decoder decodes the syntex element init_qp_minus26, the decoder adds the 26 with the init_qp_minus26 to determine the initial value of SliceQpy in an example.

The syntax slice_qp_delta specifies the initial modification value (initial changes) of QpY to be used for the coding blocks in the slice segment layer until modified by the value of CuQpDeltaVal in the coding unit layer. The initial value of the QpY quantization parameter for the slice, SliceQpY, is derived as Eq. 3

$$SliceQp_Y = 26 + init\_qp\_minus26 + slice\_qp\_delta \qquad \text{Eq. 3}$$

It is noted that the value of SliceQpY shall be in the range of $-QpBdOffsetY$ to $+51$, inclusive. In an example, when the decoder decodes the intia_qp_minus26 and the nonzero slice_qp_delta, the decoder calculates the initial value of QpY for the slice according to Eq. 3.

According to some aspects of the disclosure, when the dynamic range of QP values supported in the standard or codec has been changed, the initial or default QP value at slice level is suitably adjusted.

According to an aspect of the disclosure, the initial slice level QP value is adjusted according to the supported maximum QP value. In an embodiment, when the supported maximum QP value is maxQP (an odd positive integer number), the initial slice level QP value can be set according to half of this value, for example, (maxQP+1)>>1. In another example, half of the maximum QP value can be set as maxQP>>1. The signaled syntax element init_qp_minusXX (XX refers to the adjusted initial slice level QP value) can be set as the real initial slice level QP value minus the above half of the maximum value, i.e., minus ((maxQP+1)>>1). Then the value of init_qp_minusXX is constrained in the range of $-((maxQP>>1)+QpBdOffset_Y)$ to $+((maxQP+1)>>1)$, inclusive. Or in another example, the value of init_qp_minusXX is constrained in the range of $-(((maxQP+1)>>1)+QpBdOffset_Y)$ to $+(maxQP>>1)$, inclusive. Accordingly, at the decoder side, the decoder decodes the syntax element init_qp_minusXX, calculates half of the maximum QP value ((maxQP+1)>>1 or maxQP>>1), and calculates a sum of init_qp_minusXX and the half of the maximum QP value. The decoder then sets the initial slice level QP value according to the sum.

In another embodiment, when the supported maximum QP value is maxQP (an odd positive integer number), the initial slice level QP value can be set according to a default constant, for example, 26, or 28. The signaled syntax element initial_qp_minusXX (XX refers to the initial slice level QP value, for example, 26, or 28) can be set as the real initial slice level QP value minus the above default constant, i.e., minus 26 or minus 28. Then the value of init_qp_minusXX is constrained in the range of $-(XX+QpBdOffsetY)$ to $+(maxQP-XX)$, inclusive. Accordingly, at the decoder side, the decoder decodes the syntax element init_qp_minus28 for example, and adds 28 to the init_qp_minus28 to calculate the initial slice level QP value.

In an example, the maximum possible QP value is 63. In one embodiment, the initial QP value at slice level is set according to half of the maximum QP value ((maxQP+1)>>1) which equals 32, and then syntaxes init_qp_minus32, slice_qp_delta are defined.

The syntax init_qp_minus32 plus 32 specifies the initial value of $SliceQp_Y$ for each slice referring to the PPS. The initial value of $SliceQp_Y$ is modified at the slice segment layer when a non-zero value of slice_qp_delta is decoded. The value of init_qp_minus32 shall be in the range of $-(32+QpBdOffset_Y)$ to $+31$, inclusive.

The syntax slice_qp_delta specifies the initial modification value of $Qp_Y$ to be used for the coding blocks in the slice until modified by the value of CuQpDeltaVal in the coding unit layer. The initial value of the $Qp_Y$ quantization parameter for the slice, $SliceQp_Y$, is derived as Eq. 4

$$SliceQp_Y=32+init\_qp\_minus32+slice\_qp\_delta \qquad Eq. 4$$

The value of SliceQpY shall be in the range of −QpBdOffsetY to +63, inclusive. In an example, the decoder decodes the syntax elements init_qp_minus32 and the slice_qp_delta, and uses Eq. 4 to calculate the initial value for the slice level QP.

In another embodiment, the initial QP value at slice level is set according to half of the maximum QP value (maxQP>>1) which is 31, and then the syntaxes init_qp_minus31, and slice_qp_delta are defined.

The syntax init_qp_minus31 plus 31 specifies the initial value of $SliceQp_Y$ for each slice referring to the PPS. The initial value of $SliceQp_Y$ is modified at the slice segment layer when a non-zero value of slice_qp_delta is decoded. The value of init_qp_minus31 shall be in the range of −(31+QpBdOffset$_Y$) to +32, inclusive.

The syntax slice_qp_delta specifies the initial modification value of QpY to be used for the coding blocks in the slice until modified by the value of CuQpDeltaVal in the coding unit layer. The initial value of the QpY quantization parameter for the slice, SliceQpY, is derived as Eq. 5

$$SliceQpY=31+init\_qp\_minus31+slice\_qp\_delta \qquad Eq. 5$$

The value of $SliceQp_Y$ shall be in the range of −QpBdOffset$_Y$ to +63, inclusive. In an example, the decoder decodes the syntax elements init_qp_minus31 and the slice_qp_delta, and uses Eq. 5 to calculate the initial value for the slice level QP.

In another embodiment, the initial QP value at slice level is set to be a constant value 26, and the syntaxes init_qp_minus26 and slice_qp_delta are defined.

The syntax init_qp_minus26 plus 26 specifies the initial value of SliceQpY for each slice referring to the PPS. The initial value of SliceQpY is modified at the slice segment layer when a non-zero value of slice_qp_delta is decoded. The value of init_qp_minus26 shall be in the range of −(26+QpBdOffsetY) to +37, inclusive.

The syntax slice_qp_delta specifies the initial modification value of QpY to be used for the coding blocks at the slice segment layer until modified by the value of CuQpDeltaVal in the coding unit layer. The initial value of the QpY quantization parameter for the slice, SliceQpY, is derived as Eq. 6

$$SliceQpY=26+init\_qp\_minus26+slice\_qp\_delta \qquad Eq. 6$$

The value of SliceQpY shall be in the range of −QpBdOffsetY to +63, inclusive. In an example, the decoder decodes the syntax elements init_qp_minus26 and the slice_qp_delta, and uses Eq. 6 to calculate the initial value for the slice level QP.

Figure 7:
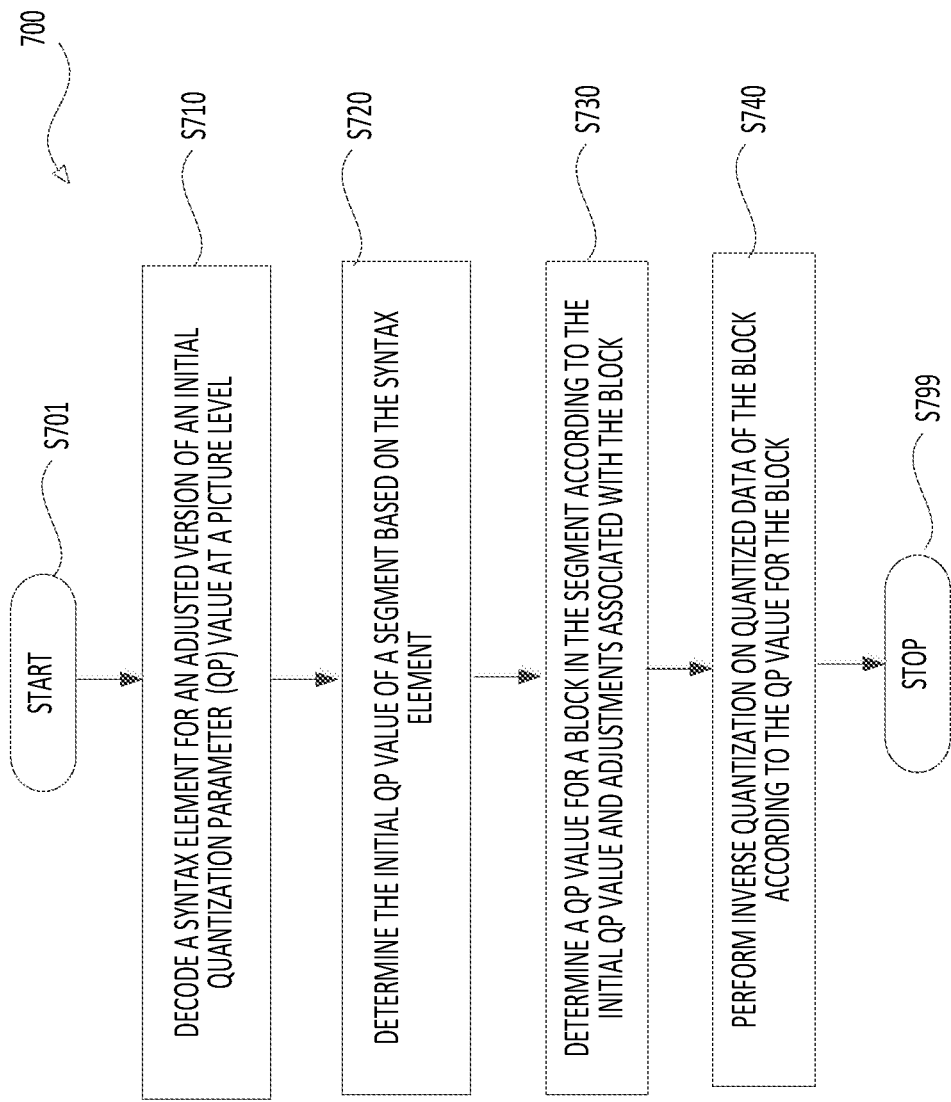
FIG. 7 shows a flow chart outlining a process example according to an embodiment of the disclosure.

FIG. 7 shows a flow chart outlining a process (700) according to an embodiment of the disclosure. The process (700) can be used in the reconstruction of a block coded in intra mode, so to generate a prediction block for the block under reconstruction. In various embodiments, the process (700) are executed by processing circuitry, such as the processing circuitry in the terminal devices (110), (120), (130) and (140), the processing circuitry that performs functions of the video encoder (203), the processing circuitry that performs functions of the video decoder (210), the processing circuitry that performs functions of the video decoder (310), the processing circuitry that performs functions of the intra prediction module (352), the processing circuitry that performs functions of the video encoder (403), the processing circuitry that performs functions of the predictor (435), the processing circuitry that performs functions of the intra encoder (522), the processing circuitry that performs functions of the intra decoder (672), and the like. In some embodiments, the process (700) is implemented in software instructions, thus when the processing circuitry executes the software instructions, the processing circuitry performs the process (700). The process starts at (S701) and proceeds to (S710).

At (S710), an adjusted version of an initial QP value at a picture level for a picture is decoded from a coded video bitstream. The adjusted version is in a range with an upper boundary that is changed with a maximum QP value.

At (S720), the initial QP value of a segment is determined based on the syntax element. The segment can be a slice, a tile, a group of tiles and the like. In an example, when the syntax element is init_qp_minus26, a sum of the value of init_qp_minus26 and 26 is calculated. In an example, when the syntax element is init_qp_minus31, a sum of the value of init_qp_minus31 and 31 is calculated. In an example, when non-zero slice_delta_qp is decoded, the slice_delta_qp is added with the sum to determine the initial QP value at the segment level.

At (S730), the QP value for a block in the segment is determined according to the initial QP value of the segment and adjustments associated with the block. In an example, the block level adjustment, such as the value of CuQpDeltaVal at the coding unit layer, is determined. Then, the QP value of the block can be calculated, for example, as a sum of the QP value for the segment and the value of CuQpDeltaVal.

At (S740), inverse quantization on quantized data of the block is performed according to the QP value for the block. Then, samples of the block are reconstructed based on the results of the inverse quantization. Then, the process proceeds to (S799) and terminates.

The techniques described above, can be implemented as computer software using computer-readable instructions and physically stored in one or more computer-readable media. For example, FIG. 8 shows a computer system (800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
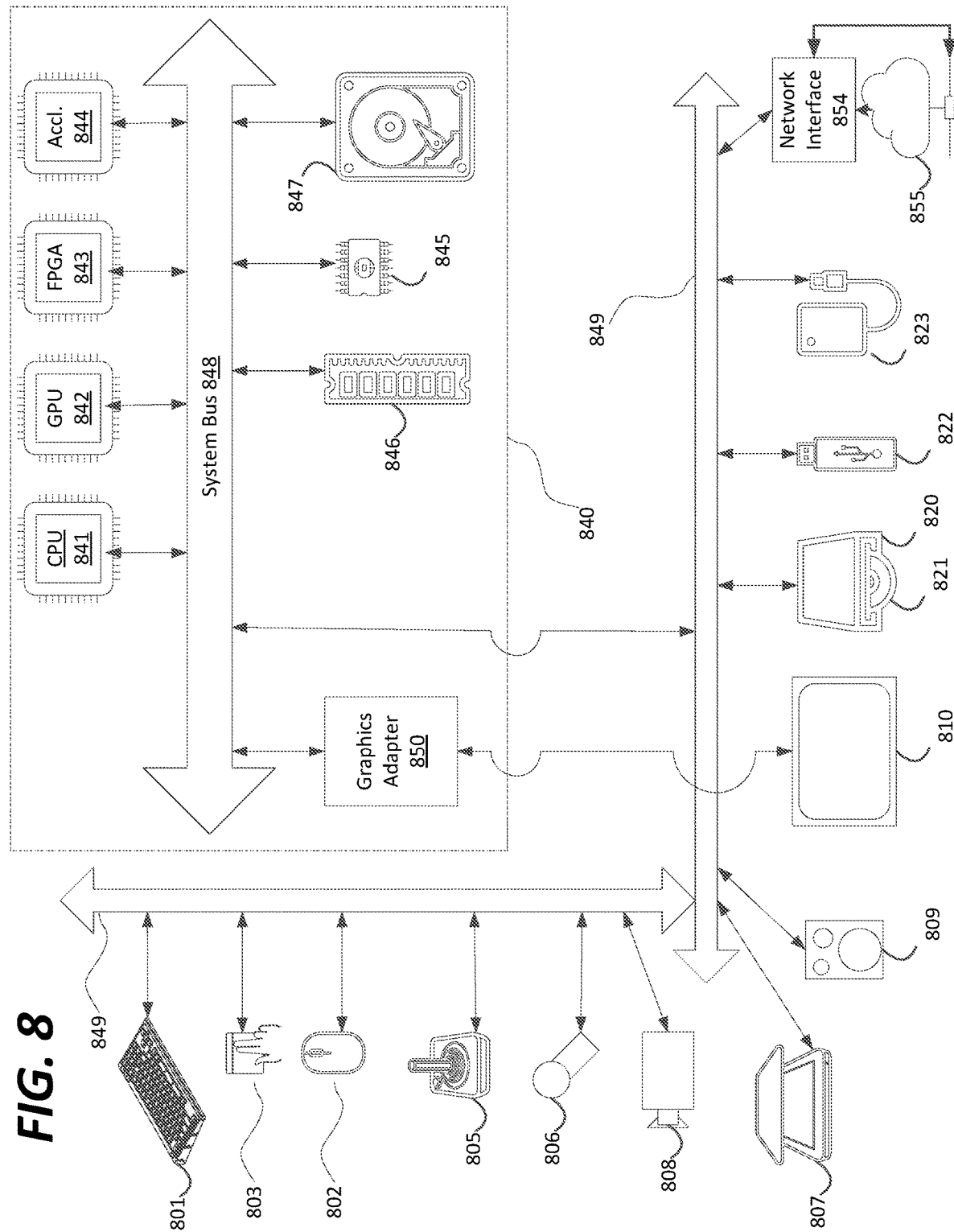
FIG. 8 is a schematic illustration of a computer system in accordance with an embodiment.

The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can be also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
obtaining an adjustment value for a segment in a picture;
decoding, by processing circuitry of the decoder, from a coded video bitstream, a syntax element for an adjusted version of an initial quantization parameter (QP) value at a picture level for the picture in the coded video bitstream, wherein
the initial QP value at the picture level is in a range [−(26+QpBdOffset), +37],
the adjusted version of the initial QP value at the picture level is in a range [−QpBdOffset, +63], and
the QpBdOffset comprises a value of a luma quantization parameter range offset;
determining a QP value for a block in the segment based on the initial QP value and the adjustment value for the segment; and
performing an inverse quantization on quantized data of the block according to the determined QP value for the block.

2. The method of claim 1, wherein
the QP value for the block in the segment is derived based on formula SliceQpY=26+init_qp_minus26+slice_qp_delta,
SliceQpY equals to the adjusted version of the initial QP value at the picture level,
a sum of init_qp_minus26 and 26 specifies an initial value of the SliceQpY for the block in the segment, and
slice_qp_delta specifies an initial modification value of the QP value for the block in the segment.

3. The method of claim 1, wherein the adjustment value is calculated according to one of
a right bit-shift of a maximum QP value, and
a right bit-shift of a sum of the maximum QP value and one.

4. The method of claim 2, wherein the slice_qp_delta is further modified by a value of CuQpDeltaVal in a coding unit layer.

5. The method of claim 1, further comprising:
obtaining a block-level adjustment value associated with the block; and
determining the QP value for the block further according to the block-level adjustment value.

6. The method of claim 1, wherein the initial QP value is decoded from a picture parameter set of the coded video bitstream.

7. The method of claim 1, wherein the segment comprises a slice, a tile, or a group of tiles.

8. An apparatus for video decoding, comprising:
processing circuitry configured to:
obtain an adjustment value for a segment in a picture;
decode, from a coded video bitstream, a syntax element for an adjusted version of an initial quantization parameter (QP) value at a picture level for the picture in the coded video bitstream, wherein
the initial QP value at the picture level is in a range [−(26+QpBdOffset), +37],
the adjusted version of the initial QP value at the picture level is in a range [−QpBdOffset, +63], and
the QpBdOffset comprises a value of a luma quantization parameter range offset;
determine a QP value for a block in the segment based on the initial QP value and the adjustment value for the segment; and
perform an inverse quantization on quantized data of the block according to the determined QP value for the block.

9. The apparatus of claim 8, wherein
the QP value for the block in the segment is derived based on formula SliceQpY=26+init_qp_minus26+slice_qp_delta,
SliceQpY equals to the adjusted version of the initial QP value at the picture level,
a sum of init_qp_minus26 and 26 specifies an initial value of the SliceQpY for the block in the segment, and
slice_qp_delta specifies an initial modification value of the QP value for the block in the segment.

10. The apparatus of claim 8, wherein the processing circuitry is configured to calculate the adjustment value according to one of
a right bit-shift of a maximum QP value, and
a right bit-shift of a sum of the maximum QP value and one.

11. The apparatus of claim 9, wherein the slice_qp_delta is further modified by a value of CuQpDeltaVal in a coding unit layer.

12. The apparatus of claim 8, wherein the processing circuitry is further configured to:
obtain a block-level adjustment value associated with the block; and
determine the QP value for the block further according to the block-level adjustment value.

13. The apparatus of claim 8, wherein the initial QP value is decoded from a picture parameter set of the coded video bitstream.

14. The apparatus of claim 8, wherein the segment comprises a slice, a tile, or a group of tiles.

15. A non-transitory computer-readable medium storing instructions which when executed by a computer for video decoding cause the computer to perform:
obtaining an adjustment value for a segment in a picture;
decoding, from a coded video bitstream, a syntax element for an adjusted version of an initial quantization parameter (QP) value at a picture level for the picture in the coded video bitstream, wherein
the initial QP value at the picture level is in a range [−(26+QpBdOffset), +37],
the adjusted version of the initial QP value at the picture level is in a range [−QpBdOffset, +63], and
the QpBdOffset comprises a value of a luma quantization parameter range offset;
determining a QP value for a block in the segment based on the initial QP value and the adjustment value for the segment; and
performing an inverse quantization on quantized data of the block according to the determined QP value for the block.

16. The non-transitory computer-readable medium of claim 15, wherein
the QP value for the block in the segment is derived based on formula SliceQpY=26+init_qp_minus26+slice_qp_delta,
SliceQpY equals to the adjusted version of the initial QP value at the picture level,
a sum of init_qp_minus26 and 26 specifies an initial value of the SliceQpY for the block in the segment, and
slice_qp_delta specifies an initial modification value of the QP value for the block in the segment.

17. The non-transitory computer-readable medium of claim 16, wherein the slice_qp_delta is further modified by a value of CuQpDeltaVal in a coding unit layer.

18. The non-transitory computer-readable medium of claim 15, wherein the instructions which when executed by the computer for video decoding further cause the computer to perform:
obtaining a block-level adjustment value associated with the block; and
determining the QP value for the block further according to the block-level adjustment value.

19. The non-transitory computer-readable medium of claim 15, wherein the initial QP value is decoded from a picture parameter set of the coded video bitstream.

20. The non-transitory computer-readable medium of claim 15, wherein the segment comprises a slice, a tile, or a group of tiles.

21. A method for video encoding in an encoder, comprising:
obtaining quantized data of a block in a segment in a picture;
obtaining a quantization parameter (QP) value for the block
obtaining an adjustment value for the segment in the picture;
determining an adjusted version of an initial QP value at a picture level for the picture, wherein
the initial QP value at the picture level is in a range [ −( 26 + QpBdOffset ), +37],
the adjusted version of the initial QP value at the picture level is in a range [−QpBdOffsetm +63],
the QpBdOffset comprises a value of a luma quantization parameter range offset, and
the QP value for the block is specified according to the initial QP value and the adjustment value for the segment;
performing an inverse quantization on the quantized data of the block according to the QP value for the block for reconstructing residue data of the block; and
generating a code video bitstream for output, including encoding the quantized data and a syntax element for determining the adjusted version of the initial QP value.

22. The method of claim 21, wherein
the QP value for the block in the segment is derived based on formula SliceQpY = 26 +init_qp_minus26 +slice_qp_delta,
SliceQpY equals to the adjusted version of the initial QP value at the picture level,
a sum of init_qp_minus26 and 26 specifies an initial value of the SliceQpY for the block in the segment, and
slice_qp_delta specifies an initial modification value of the QP value for the block in the segment.

23. The method of claim 21, wherein the adjustment value is calculated according to one of
a right bit-shift of a maximum QP value, and
a right bit-shift of a sum of the maximum QP value and one.

* * * * *